(12) United States Patent
Kwon et al.

(10) Patent No.: US 7,961,971 B2
(45) Date of Patent: Jun. 14, 2011

(54) METHOD AND APPARATUS FOR PERFORMING PARALLEL BOX FILTERING IN REGION BASED IMAGE PROCESSING

(75) Inventors: Soon Kwon, Daegu (KR); Jong Hun Lee, Daegu (KR); Kyeong Ryeol Bae, Daegu (KR); Byung In Moon, Seoul (KR)

(73) Assignee: Daegu Gyeongbuk Institute of Science and Technology (KR)

( * ) Notice: Subject to any disclaimer, the term of this patent is extended or adjusted under 35 U.S.C. 154(b) by 0 days.

(21) Appl. No.: 12/915,179

(22) Filed: Oct. 29, 2010

(65) Prior Publication Data
US 2011/0116727 A1 May 19, 2011

(30) Foreign Application Priority Data

Nov. 13, 2009 (KR) ........................ 10-2009-0109477

(51) Int. Cl.
*G06K 9/40* (2006.01)
*G06K 9/54* (2006.01)
*G06K 9/60* (2006.01)
(52) U.S. Cl. ....................................... 382/260; 382/304
(58) Field of Classification Search .................. 382/212, 382/260, 262, 304
See application file for complete search history.

(56) References Cited

U.S. PATENT DOCUMENTS

| | | | | |
|---|---|---|---|---|
| 4,947,446 A | * | 8/1990 | Jutand et al. | 382/279 |
| 5,136,664 A | * | 8/1992 | Bersack et al. | 382/304 |
| 6,927,775 B2 | * | 8/2005 | Schimpf et al. | 345/503 |

FOREIGN PATENT DOCUMENTS

| | | |
|---|---|---|
| JP | 11168725 | 6/1999 |
| JP | 2005-092362 | 4/2005 |
| KR | 100305190 | 7/2001 |
| KR | 100803045 | 2/2008 |

* cited by examiner

*Primary Examiner* — John B Strege
(74) *Attorney, Agent, or Firm* — Harness, Dickey & Pierce, P.L.C.

(57) ABSTRACT

A method and apparatus for performing parallel box filtering in region based image processing is provided. The method of performing parallel box filtering in region based image processing includes selecting parallel pixel blocks having a size of M×N to be operated in parallel, selecting pixels included in a mask region having a size of K×L that is a parallel pixel operation region and a first region having a size of (M+K−1)×(N+L−1) that corresponds to overlapping masks of M*N, selecting pixels of a second region commonly included in the mask regions of M*N and storing the results of operation with respect to the pixels of the second region as repeated operation values, and operating block operation values with respect to the parallel pixel blocks using the repeated operation values.

8 Claims, 35 Drawing Sheets

FIG. 4B $S$ = $M$ + $M+1$ + $\cdots$ + $K-1$ + $K$ $S$ = $M$ + $M+1$ + $\cdots$ + $K-1$ + $K$ $S$ = $M$ + $M+1$ + $\cdots$ + $K-1$ + $K$ $\vdots$ $S$ = $M$ + $M+1$ + $\cdots$ + $K-1$ + $K$

$S$ = $N$ + $N+1$ + $\cdots$ + $L-1$ + $L$ $S$ = $N$ + $N+1$ + $\cdots$ + $L-1$ + $L$ $S$ = $N$ + $N+1$ + $\cdots$ + $L-1$ + $L$

$A = S + a + \cdots \quad N-1$ $B = S + b + \cdots + N-1 + L+1$ $\vdots$ $C = S + L+1 + \cdots + L+N-1$ $\vdots$ $A = S + a + \cdots + N-1$ $B = S + b + \cdots + N-1 + L+1$

$S$ = $M$ + $M+1$ + $\cdots$ + $K-1$ + $K$ $S$ = $M$ + $M+1$ + $\cdots$ + $K-1$ + $K$ $S$ = $M$ + $M+1$ + $\cdots$ + $K-1$ + $K$

$$\vdots$$

$$F = C - N - \cdots - 2N-1 + L+N + \cdots + L+2N-1$$

$$\vdots$$

$$D = C - N + L+N$$

$$E = C - N - N+1 + L+N + L+N+1$$

$$\vdots$$

$$F = C - N - \cdots - 2N-1 + L+N + \cdots + L+2N-1$$

723 → $n = n - M - \cdots - 2M-1 + K+M + \cdots + K+2M-1$

⋮

725 → $p = p - M + K+M$

726 → $p = p - M - M+1 + K+M + K+M+1$

⋮

727 → $p = p - M - \cdots - 2M-1 + K+M + \cdots + K+2M-1$

FIG. 7C $$\boxed{D} = \boxed{C} - \boxed{N} + \boxed{L+N}$$

$$\boxed{E} = \boxed{C} - \boxed{N} - \boxed{N+1} + \boxed{L+N} + \boxed{L+N+1}$$

⋮

$$\boxed{F} = \boxed{C} - \boxed{N} - \cdots - \boxed{2N-1} + \boxed{L+N} + \cdots + \boxed{L+2N-1}$$

⋮

$$\boxed{D} = \boxed{C} - \boxed{N} + \boxed{L+N}$$

$$\boxed{E} = \boxed{C} - \boxed{N} - \boxed{N+1} + \boxed{L+N} + \boxed{L+N+1}$$

⋮

$$\boxed{F} = \boxed{C} - \boxed{N} - \cdots - \boxed{2N-1} + \boxed{L+N} + \cdots + \boxed{L+2N-1}$$

FIG. 8C $S = c + d + e + f + g + h + i + j + k$ $S = c + d + e + f + g + h + i + j + k$ $S = c + d + e + f + g + h + i + j + k$ $A = S + a + b \qquad A = S + a + b$ $B = S + b + l \qquad B = S + b + l$ $C = S + l + m \qquad C = S + l + m$ $A = S + a + b$ $B = S + b + l$ $C = S + l + m$

FIG. 9A

FIG. 9C $S = c + d + e + f + g + h + i + j + k$ $S = c + d + e + f + g + h + i + j + k$ $S = c + d + e + f + g + h + i + j + k$ $A = S + a + b$  $\qquad$  $A = S + a + b$ $B = S + b + l$  $\qquad$  $B = S + b + l$ $C = S + l + m$  $\qquad$  $C = S + l + m$ $A = S + a + b$ $B = S + b + l$ $C = S + l + m$

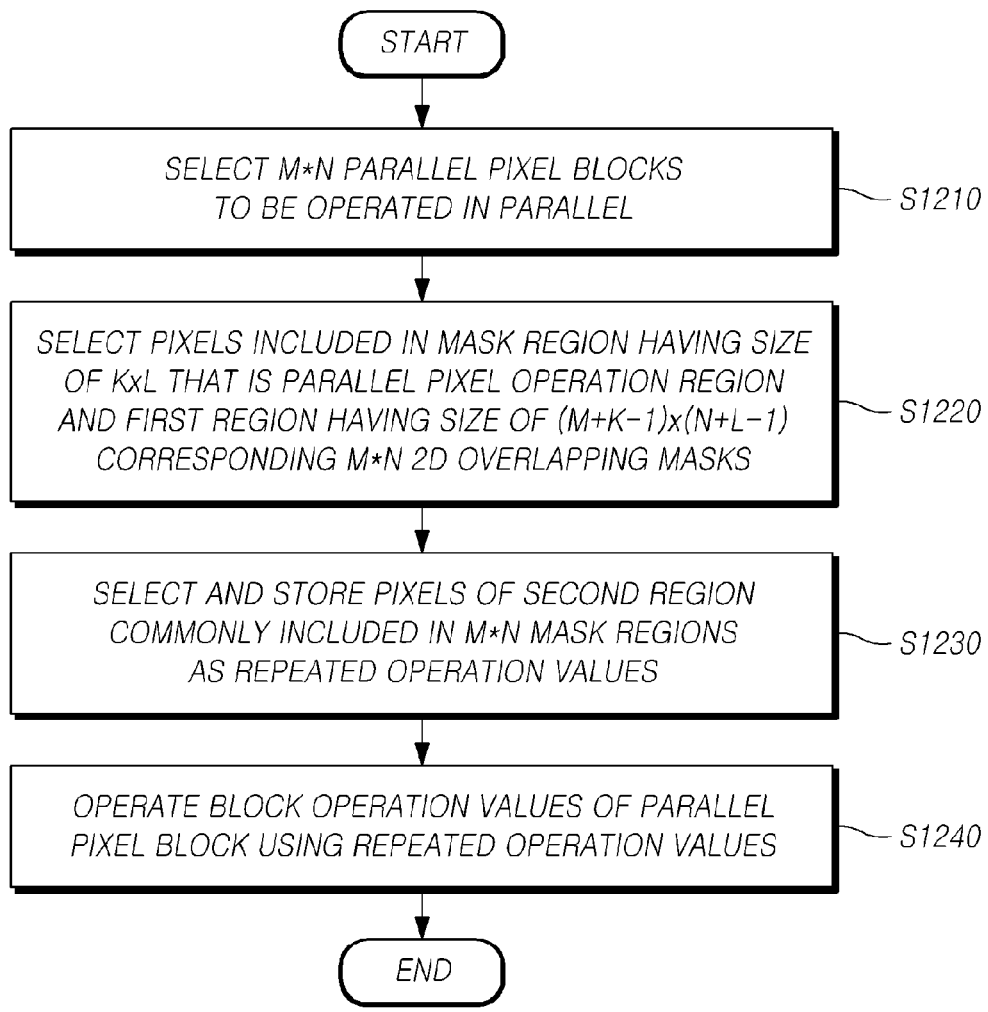

US 7,961,971 B2

METHOD AND APPARATUS FOR PERFORMING PARALLEL BOX FILTERING IN REGION BASED IMAGE PROCESSING

CROSS-REFERENCE TO RELATED APPLICATIONS

This application claims the benefit of Korean Patent Application No. 10-2009-0109477 filed Nov. 13, 2009, issued as Korean Patent No. 0973964 dated Jul. 29, 2010. The disclosures of the above application are incorporated herein by reference.

BACKGROUND OF THE INVENTION

1. Field of the Invention

The present invention relates to a method and apparatus for performing parallel box filtering in region based image processing.

2. Description of the Prior Art

Many methods related to region based filtering have been proposed to make up for the weak points in a pixel-unit data processing method in image processing. For example, in the case of an mean (average) filter, there is a processing method that replaces an mean value of pixel data in a given region mask by a pixel value corresponding to the center of the region. Also, a normalized cross correlation (hereinafter referred to as "NCC") performs an operation with respect to pixels between two regions in order to analyze the correlation between the regions.

In such a region based data processing method, a process for obtaining sums or mean value within a region is required. In this case, if the size of the region is large, the number of pixels included in the corresponding region increases, and thus the number of pixels to be processed also increases. As a result, the amount of computation that is performed to obtain sums or mean value in the region increases in proportion to the number of pixels in the region, and this causes a problem that a large amount of resources (time, processor, and the like) is required for the computation.

SUMMARY OF THE INVENTION

Accordingly, the present invention has been made to solve the above-mentioned problems occurring in the prior art, and proposes a box filtering technique, which is a method capable of obtaining at high speed the sum of masks having a predetermined size in a two-dimensional data arrangement such as image information regardless of the mask size, in order to achieve a much faster operation speed and minimization of a repeated amount of computation through a parallel processing structure.

In particular, the present invention proposes to improve the operation speed by separately storing the repeated operation and making the corresponding result of operation be reused.

In accordance with one aspect of the present invention, there is provided a method of performing parallel box filtering in region based image processing, which includes a first step of selecting parallel pixel blocks having a size of M×N to be operated in parallel; a second step of selecting pixels included in a mask region having a size of K×L that is a parallel pixel operation region and a first region having a size of (M+K−1)×(N+L−1) that corresponds to overlapping the M*N masks; a third step of selecting pixels of a second region commonly included in the mask regions of M*N and storing the results of operation with respect to the pixels of the second region as repeated operation values; and a fourth step of operating block operation values with respect to the parallel pixel blocks using the repeated operation values.

In accordance with another aspect of the present invention, there is provided an apparatus for performing parallel box filtering in region based image processing, which includes an operation unit selecting parallel pixel blocks having a size of M×N to be operated in parallel and selecting pixels included in a mask region having a size of K×L that is a parallel pixel operation region and a first region having a size of (M+K−1)×(N+L−1) that corresponds to overlapping the M*N masks; a repeated operation storage unit selecting pixels of a second region commonly included in the mask regions of M*N and storing the results of operation with respect to the pixels of the second region as repeated operation values; and a block operation storage unit storing the results of block operation values with respect to the parallel pixels; wherein the operation unit operates the block operation values with respect to the parallel pixel blocks using the repeated operation values stored in the repeated operation storage unit and storing the block operation values in the block operation storage unit.

With the above-described configuration according to an embodiment of the present invention, in an applicable region based data processing or filtering method in applications of a computer vision based image processing system, the sum or an mean value of pixels in the mask region can be operated at high speed through the method based on the box-filtering.

In particular, by simultaneously box-filtering the pixels in the unit of a pixel and processing the repeated operation only once, the operation speed can be improved.

BRIEF DESCRIPTION OF THE DRAWINGS

The above and other objects, features and advantages of the present invention will be more apparent from the following detailed description taken in conjunction with the accompanying drawings, in which:

FIGS. 4A to 4E are diagrams illustrating processes of performing a block operation according to an embodiment of the present invention;

FIGS. 5A to 5D are diagrams illustrating processes of performing a block operation according to an embodiment of the present invention;

FIGS. 6A to 6D are diagrams illustrating processes of performing a block operation according to an embodiment of the present invention;

FIGS. 7A to 7C are diagrams illustrating processes of performing a block operation according to an embodiment of the present invention;

FIGS. 8A to 8C are diagrams illustrating processes of operating added values of a first block through implementation of the processes of FIGS. 4A to 4E;

FIGS. 9A to 9C are diagrams illustrating processes of operating block added values of a second block through implementation of the processes of FIGS. 5A to 5D;

FIGS. 10A to 10C are diagrams illustrating processes of operating block added values of a third block through implementation of the processes of FIGS. 6A to 6D;

FIGS. 11A to 11C are diagrams illustrating processes of operating block added values of a fourth block through implementation of the processes of FIGS. 7A to 7C;

FIG. 12 is a diagram illustrating processes of performing a block operation according to an embodiment of the present invention;

DETAILED DESCRIPTION OF THE PREFERRED EMBODIMENTS

Figure 1:
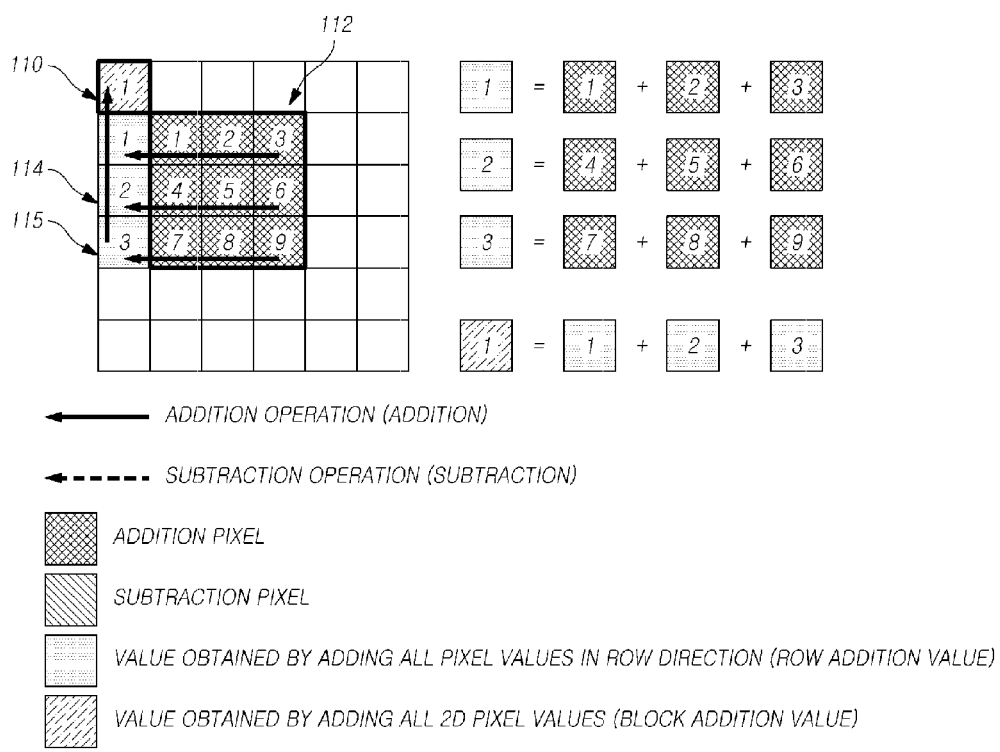
FIGS. 1A to 1D are diagrams illustrating a region based data processing process in the related art.

Hereinafter, a preferred embodiment of the present invention will be described with reference to the accompanying drawings. In the following description and drawings, the same reference numerals are used to designate the same or similar components, and so repetition of the description on the same or similar components will be omitted. Also, in the following description of the present invention, well-known element structures and technologies are not described in detail if it is determined that they would obscure the invention in unnecessary detail.

Although the terms "first, second, A, B, (a), (b), and so forth" are used to describe diverse elements of the present invention, they are used only to discriminate an element from other elements, but do not limit the nature, sequence, or order of the corresponding elements. It should be understood that the term "connected to" or "coupled to" that is used to designate a connection or coupling of one element to another element includes both a case that an element is "directly connected or coupled to" another element and a case that an element is connected or coupled to another element via still another element.

FIGS. 1A to 1D are diagrams illustrating a region based data processing process in the related art.

Prior to the description of the present invention, the terms used in the description of the present invention will be defined as follows. 2D pixel value means value obtained by operation in pixels which are included in two-dimensional box.

In data processing, pixels that take part in the addition operation are called "addition pixels", and pixels that take part in the subtraction operation are called "subtraction pixels". On the other hand, a value obtained by adding the pixel values in a row direction is called a "row addition value", and a value obtained by adding the pixel values in a column direction is called a "column addition value". Also, a value obtained by adding all pixel values of pixels having a size of A×B pixels is called a "block addition value". In explaining an embodiment of the present invention, addition and subtraction operations are exemplified as examples of the operations. However, the present invention is not limited thereto, and can be applied to diverse operations such as addition/subtraction, mean (average) operation, deviation operation, and the like.

FIG. 1A illustrates a process of obtaining a row addition value with respect to pixels of three rows among pixels existing in a block having a size of 3×3 pixels to be operated. The block to be operated is indicated by a window mask 112. The sum of three row addition values is stored in a block addition value 110.

Figure 1B:
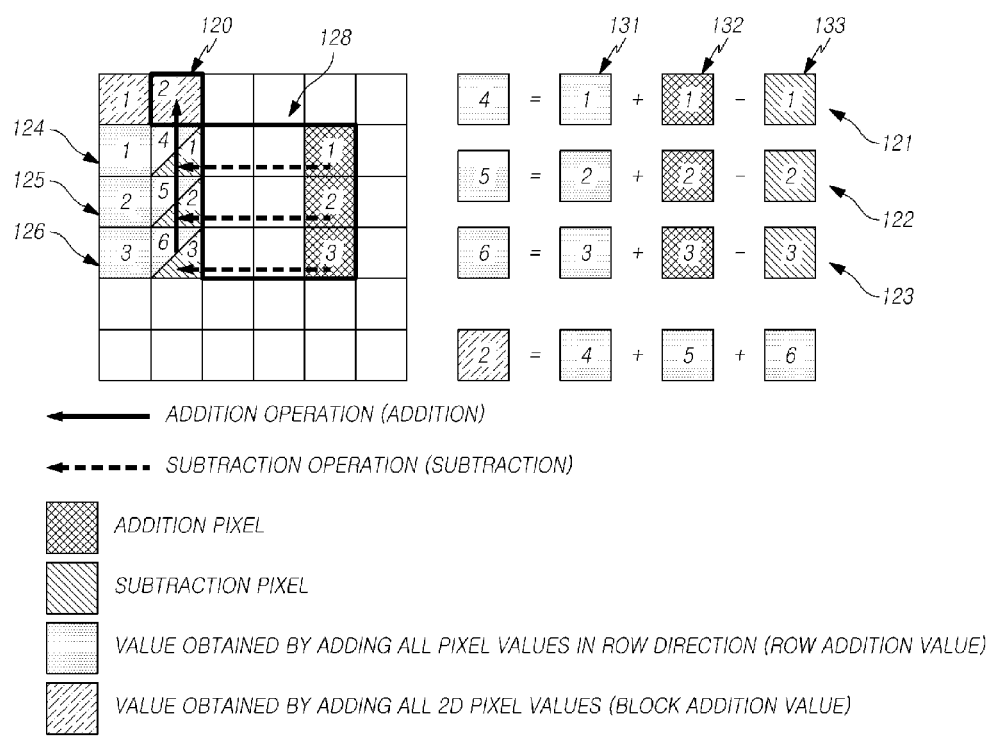

FIG. 1B is a diagram illustrating an operation process in the case where the window mask that performs the block operation is shifted to the left by one pixel size.

In FIG. 1B, in distinction from FIG. 1A, the window mask 128 is shifted to the right by one pixel to perform the operation. Although the row addition value obtaining process can add all pixel values in the row direction in the mask, it refers to the row addition value of FIG. 1A to use the calculated value operated in the process of FIG. 1A.

That is, the row addition value obtaining process 121 is composed of processes of adding a newly added pixel value 132 to the result 124 obtained by performing the row addition in FIG. 1A and subtracting a pixel value 133 that is not included in the window mask 128 from the result. This process is performed in the same manner as that in the processes 122 and 123. Also, a new block addition value 120 can be obtained by adding all of the values calculated in the processes 121, 122, and 123.

Figure 1C:
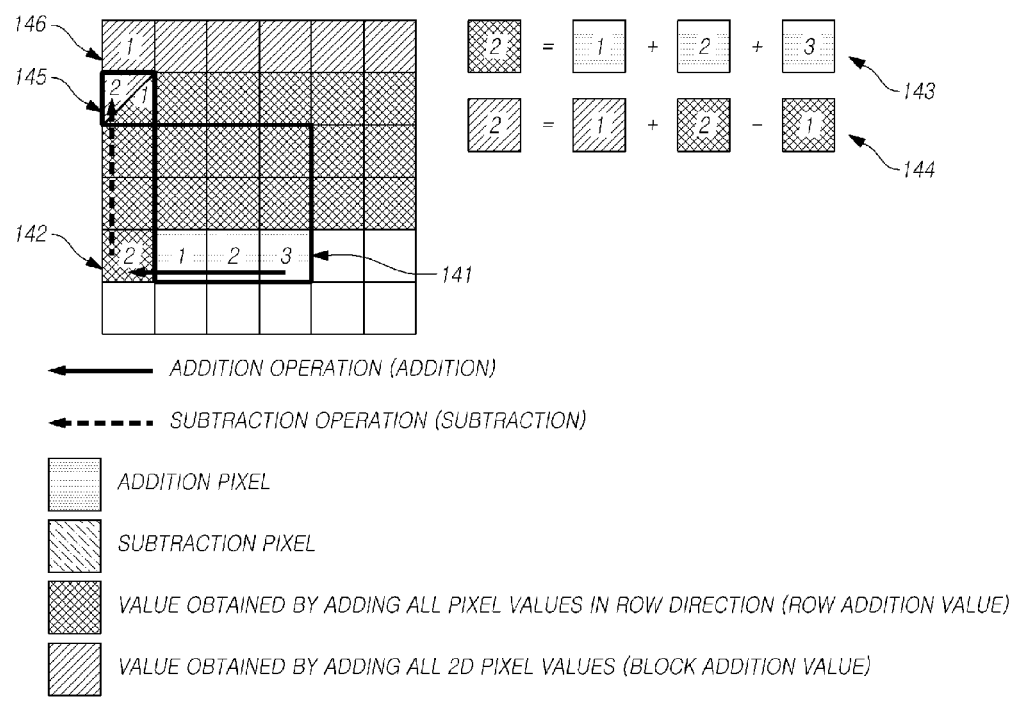

FIG. 1C is a diagram illustrating an operation process in the case where the window mask that performs the block operation has completed the shift downward, i.e. is shifted downward by one pixel size. Since the window mask 141 is shifted downward by one pixel size in comparison to the window mask in FIG. 1A, one row is added thereto. Accordingly, the row addition values of the first row and the second row are obtained using the values of 114 and 115 as they are without the necessity of a separate operation, and the row addition value 142 for the newly added row is calculated as in the process 143. The block addition value 145 can be calculated using the block addition value 146 calculated in the process 144 in FIG. 1A.

Figure 1D:
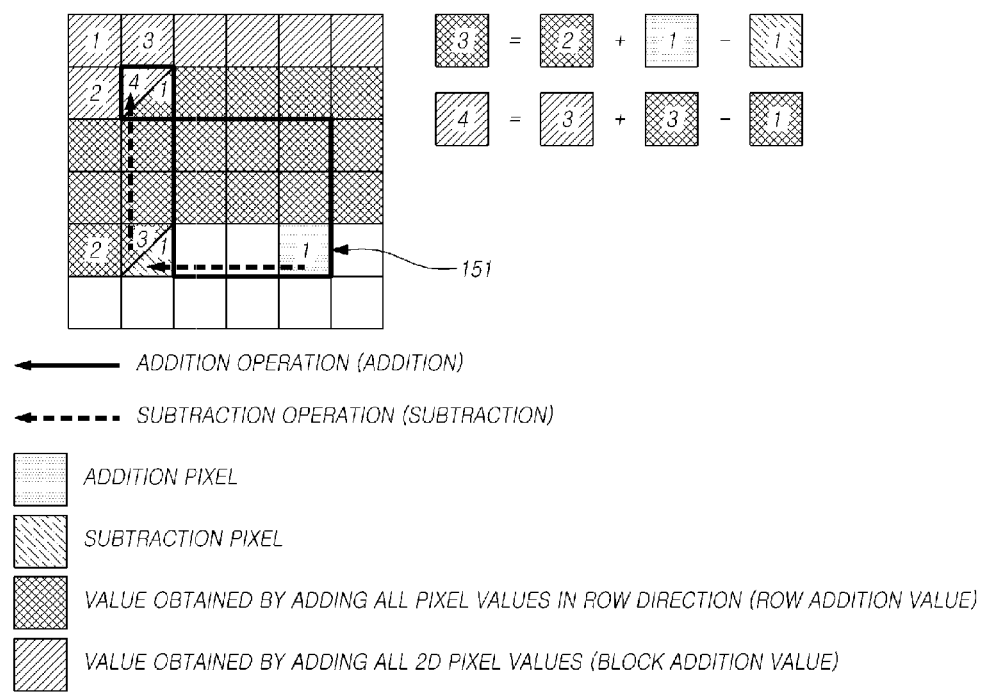

FIG. 1D is a diagram illustrating an operation process in the case where the window mask of FIG. 1C has completed the shift to the right. The window mask 151 is shifted to the right by one pixel size in comparison to the window mask 141 of FIG. 1C. The block addition value is calculated by using the results obtained in the processes of FIGS. 1A, 1B, and 1C and calculating only the last pixel 151 in the newly added row.

If the size of the window mask that determines the size of the region in FIGS. 1A to 1D is large, it is difficult to apply the window mask to an application system that requires a real-time performance due to the deterioration of the processing speed of the filter to be applied.

In the case where the regions to be compared are sequentially shifted in the whole two-dimensional image region in the window mask based data processing technique, the box filtering technique may be applied to reduce the number of operations for operating the sum of the regions.

FIGS. 1A to 1D show the processes of performing the operation through the box filtering with respect to the window mask of the image in 2-dimension. In comparison to the case where K*L adders are required to operate the sum of the pixel values in the K×L window masks, the sum (or average) can be obtained through four times the operation (two times the addition and two times the subtraction) in most masks by applying the two-dimensional box filtering as described above, and thus the cost and speed of the operation can be improved.

However, in the case of the system that outputs a high-resolution image of several tens of frames per second and in the case where the window mask search range is wide, it is not easy for the sequential operation method to cope with the required processing speed. In order to overcome this, according to embodiments of the present invention, a method of grouping pixels in the unit of a block and applying in parallel the box filtering to the pixel groups has been proposed, which will now be described.

Figure 2:
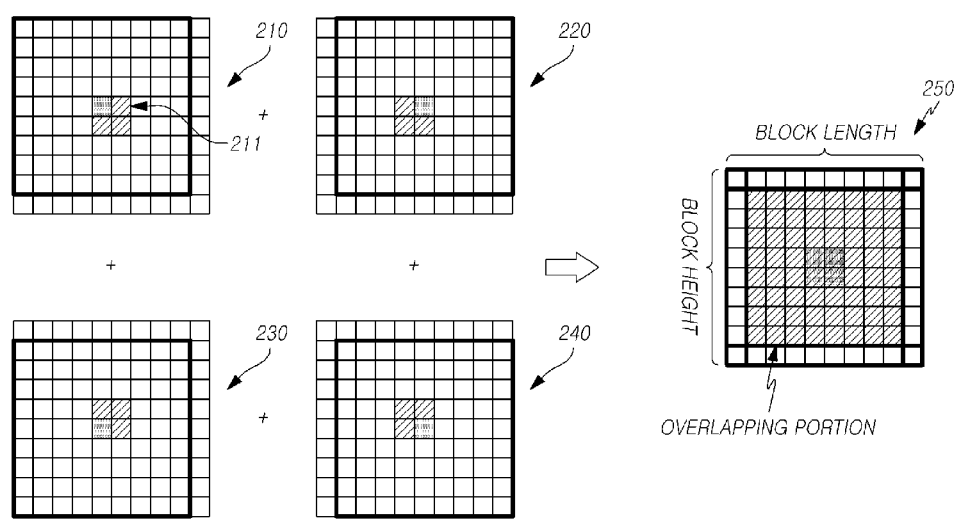
FIG. 2 is a diagram illustrating the correlation between a mask and a block according to an embodiment of the present invention.

FIG. 2 is a diagram illustrating the correlation between a mask and a block according to an embodiment of the present invention.

Four window masks 210 to 240 around adjacent K*L pixels 211 can be tied up in a block 250. The size of each of the four window masks is 9×9 pixels (length (9 pixels)×height (9 pixels)), and the size of an arrangement that includes block operation values operated with respect to the window masks is 2×2. Hereinafter, the window mask will be referred to as the "mask".

Figure 3:
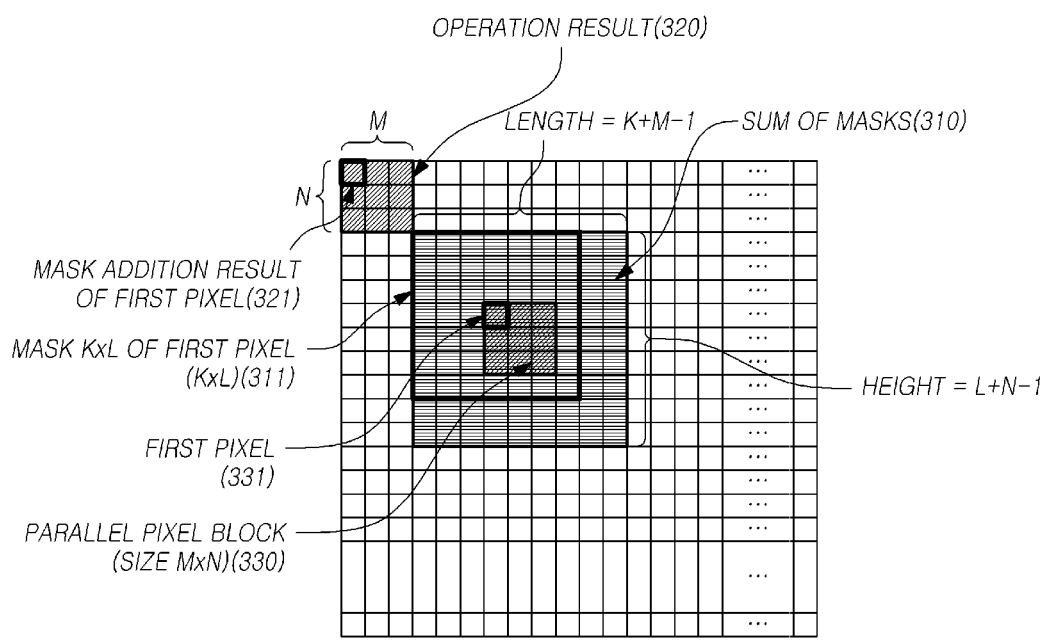
FIG. 3 is a diagram illustrating the structure of a two-dimensional data arrangement according to an embodiment of the present invention.

FIG. 3 is a diagram illustrating the structure of a two-dimensional data arrangement according to an embodiment of the present invention.

In FIG. 3, operations are simultaneously performed in parallel with respect to a pixel block 330 having the size of M×N. Neighboring pixels of the first pixel 331 in the pixel block 330 are calculated. The range of the neighboring pixels, i.e. the range of the mask 311 with respect to the first pixel has thick border line as indicated by 311 in FIG. 3. The size of the mask 311 becomes K×L. The operation result (addition result) of the pixels included in the mask 311 with respect to the first pixel 331 is stored in the first region 321 of the operation result 320. Since the size of the pixel block 330 is M×N, the operation result also becomes M×N. Also, since the respective mask regions exist with respect to the M*N pixels of the pixel block 330, the number of masks of the corresponding pixel block 330 becomes M*N in all, and the sum 310 of such mask regions is as shown in FIG. 3. Since these masks overlap one another, the size of the region 310 which is the sum of all mask regions with respect to the parallel pixel block 330 becomes (K+M−1)×(L+N−1).

In summary, the number of the resultant values 320 calculated by the addition operation is M*N, and the resultant values 320 are stored as in FIG. 3. Like the size 310 of the parallel pixel block of M×N, the number of masks is M*N, and the size of the mask is K×L. Accordingly, the size of the mask region that is composed of M*N masks each of which has the size of K*L becomes (M+K−1)*(N+L−1).

Hereinafter, the process of applying embodiment of the present will be described. For convenience in explanation, the respective pixels are distinguished by shading or deviant crease and numerals allocated to the pixels. A regular tetragon expressed as a pixel is included as a factor which is applied to the operation, such as addition, subtraction, and the like.

A process of applying the operation to the two-dimensional data arrangement region as defined in FIG. 3 includes three different kinds of operation processes as follows. That is, a process of operating a first block, a process of operating a block in the first column (horizontal) direction or in the first row (vertical direction) direction, and a process of operating a block in the remaining area in the two-dimensional data arrangement region.

FIGS. 4A to 4E are diagrams illustrating processes of performing a block operation according to an embodiment of the present invention.

Figure 4A:
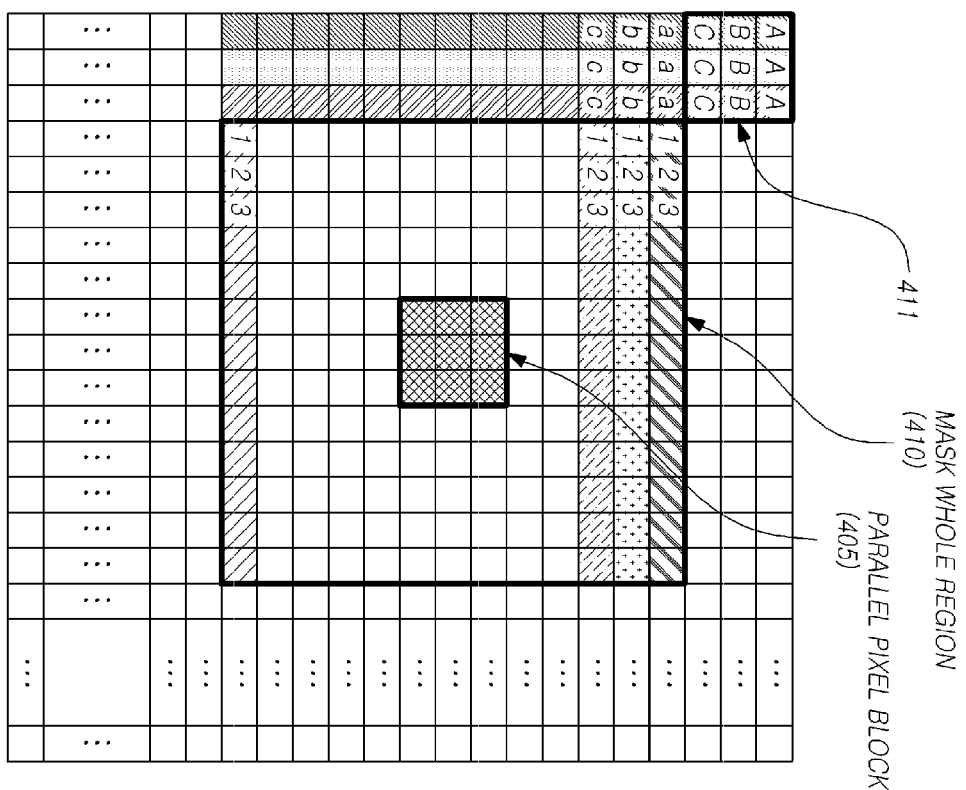

FIG. 4A is a diagram illustrating an arrangement of pixels to which the operation according to an embodiment of the present invention is to be applied. Since a parallel pixel block 405, in which the first operation is to be performed, does not have an intermediate value and the total sum previously calculated, an operation should be performed with respect to the whole mask region 410 that corresponds to the parallel pixel block. In this case, the size of the parallel pixel block is 3×3, the size of a matrix 411 for the operation values is 3×3, and the number of masks is 9 (=3*3). Hereinafter, it is exemplified that the size of the parallel pixel block is 3×3, but the present invention is not limited thereto. The number of rows and the number of columns are not necessarily equal to each other, and may be 2×3 and 5×9, respectively. Accordingly, the size of the mask may also be changed diversely.

In the proposed structure, the total sum is obtained by first obtaining the sum of horizontal lines by rows and then adding the obtained sums of the horizontal lines. In the description of the present invention, a method of obtaining the total sum by adding the sums of the horizontal lines and then adding the sums in the vertical direction is proposed. However, this is merely exemplary, and the embodiment of the present invention also includes a method of obtaining the total sum by adding all sums of the vertical lines and then adding the sums in the horizontal direction.

FIG. 4B is a diagram illustrating a process of performing an operation in advance with respect to the rows in which operations are performed in repeated according to an embodiment of the present invention.

In order to remove the repeated operation, the process obtains the horizontal sums (row addition values) of the pixels that belong to the same rows in the K×L masks, and row addition values of the pixels that belong to the same repeated rows (M, M+1, ..., K−1, K) are stored in S.

FIG. 4C is a diagram illustrating a process of performing an operation using the row addition values of the rows using horizontal sums which operations are performed only once replacing the repeated operation according to an embodiment of the present invention.

A process of obtaining the total row addition value of FIG. 4A is illustrated. "431" is obtained by adding S operated in advance in FIG. 4B and pixels (1, 2, ..., M−1) that are not included in S. Also, "432", "433", "435", "436", and "437" are calculated by a method of adding the S calculated in advance and the pixel values that are not included in S in the same manner. In FIG. 4C, "a", "b", and "c" show the operation processes with respect to the first row, the second row, and the third row in the respective mask whole regions. As can be seen from FIG. 4A, since many rows are included in the mask whole regions, although not described and illustrated, the operation may be performed in the same process up to the L+N+1 rows 438, 439, and 440, such as the fourth row, the fifth rows, and the like.

FIGS. 4D and 4E are diagrams illustrating a process of operating the block addition values.

FIG. 4D is a diagram illustrating a process of performing an operation using the column addition values of the columns using vertical sums which operations are performed only once replacing the repeated operation according to an embodiment of the present invention.

In the same manner as the process of obtaining the horizontal row values of FIG. 4B, column addition values of the pixels that belong to the same repeated rows (N, N+1, ..., L−1, L) in the process of obtaining the vertical sums (column addition values) of the pixels that belong to the same rows are stored in S.

FIG. 4E is a diagram illustrating a process of using S that are the repeated column addition values. "451" adds S operated in advance in FIG. 4D and pixels (a, a+1, ..., N−1) that are not included in S. Also, "452", "453", "455", "456", "457", "458", "459" and "460" show processes of adding S operated in advance and pixels that are not included in S.

Since the sums of the pixels indicated by S in FIGS. 4A to 4E can be repeatedly applied, they can be reused to obtain the horizontal sums of the pixels that belong to the same columns after obtaining the sums through one operation. In this case, the number of addition operations that are required to obtain S is K−M, and if this value is obtained only once, the horizontal sums can be operated by M addition operations in the operation of the remaining horizontal sums.

In the same manner, in operating the vertical sums, if S is obtained in advance only once through the (L−N) additions, the remaining vertical sums can be operated by N times additions thereof.

FIGS. 5A to 5D are diagrams illustrating processes of performing a block operation according to an embodiment of the present invention. FIG. 4A shows a process of operating a next block in the column (horizontal) direction using the addition result 411 after the operation of the parallel pixel block of FIG. 4A is completed.

Next, in order to calculate the parallel pixel block, the block is shifted in the horizontal direction by M pixels. An overlapping section occurs between the mask whole region 510 with a boundary with thick line by the shifted block 505 and the mask whole region 410 with a boundary with thick line of the block before shifting, and the portions of the added columns except for the first column to M column from the mask whole region of the previous block overlap each other. In order to make the overlapping section not calculated again, by adding the pixels in number equal to those added to the sum of the horizontal line calculated in the previous block operation process and subtracting the pixels in number equal to those taken away, the sum of the whole masks can be obtained through a small amount of operation.

FIG. 5B is a diagram illustrating a detailed calculation process according to an embodiment of the present invention. "521" indicates a calculation process using the values calculated in FIG. 4C. "M" is a pixel value that is excluded from the movement of the mask, and "K+M" indicates pixels added due to the shift of the mask. FIG. 4C shows the process of subtracting the pixel values excluded from the calculated values and adding the added pixel values. "522", "523", "525", "526", and "527" all propose a process of subtracting the pixel values excluded in the same manner and adding the added pixel values.

FIG. 5C is a diagram illustrating a process of performing a block operation using the row addition values of the column using horizontal sums which operations are performed only once replacing the repeated operations according to an embodiment of the present invention. As described above, the same process as the process performed in FIG. 4D is performed. Column addition values of the pixels that belong to the same repeated rows (N, N+1, . . . , L−1, L) in the process of obtaining the vertical sums (column addition values, i.e. block addition values) of the pixels that belong to the same rows are stored in S.

FIG. 5D is a diagram illustrating a process of calculating the block addition values using S that corresponds to the repeated column addition values. Since the same process as that explained in FIG. 4E is performed, the explanation thereof can be replaced by the explanation referring to FIG. 4C.

FIGS. 6A to 6D are diagrams illustrating processes of performing a block operation according to an embodiment of the present invention. In the same manner as FIGS. 5A to 5D, FIGS. 6A to 6D illustrate a process of performing the operation of the parallel pixel blocks in the vertical (row) direction from the addition result 411 of FIG. 4A. Even in the case of shifting the parallel pixel block in the row (vertical) direction, like the shift of the parallel pixel block in the column (horizontal) direction, the same method as the horizontal application method can be applied thereto in a state where only their directions differ from each other. By adding the pixels in number equal to those added and subtracting the pixels in number equal to those taken away using the intermediate value and the whole sum previously calculated, the sum of the whole masks can be obtained through a small amount of operation. If the block is shifted in the vertical direction by N, an overlapping section occurs between the corresponding mask whole region and the mask whole region of the block before shifting, and as a result, a new section as long as N columns is added while a section as long as N columns is taken away. The sum of the newly added horizontal lines is obtained, and then the total sum of the new block can be obtained using the intermediate value of the upper block and the total sum of the new block.

Figure 6A:
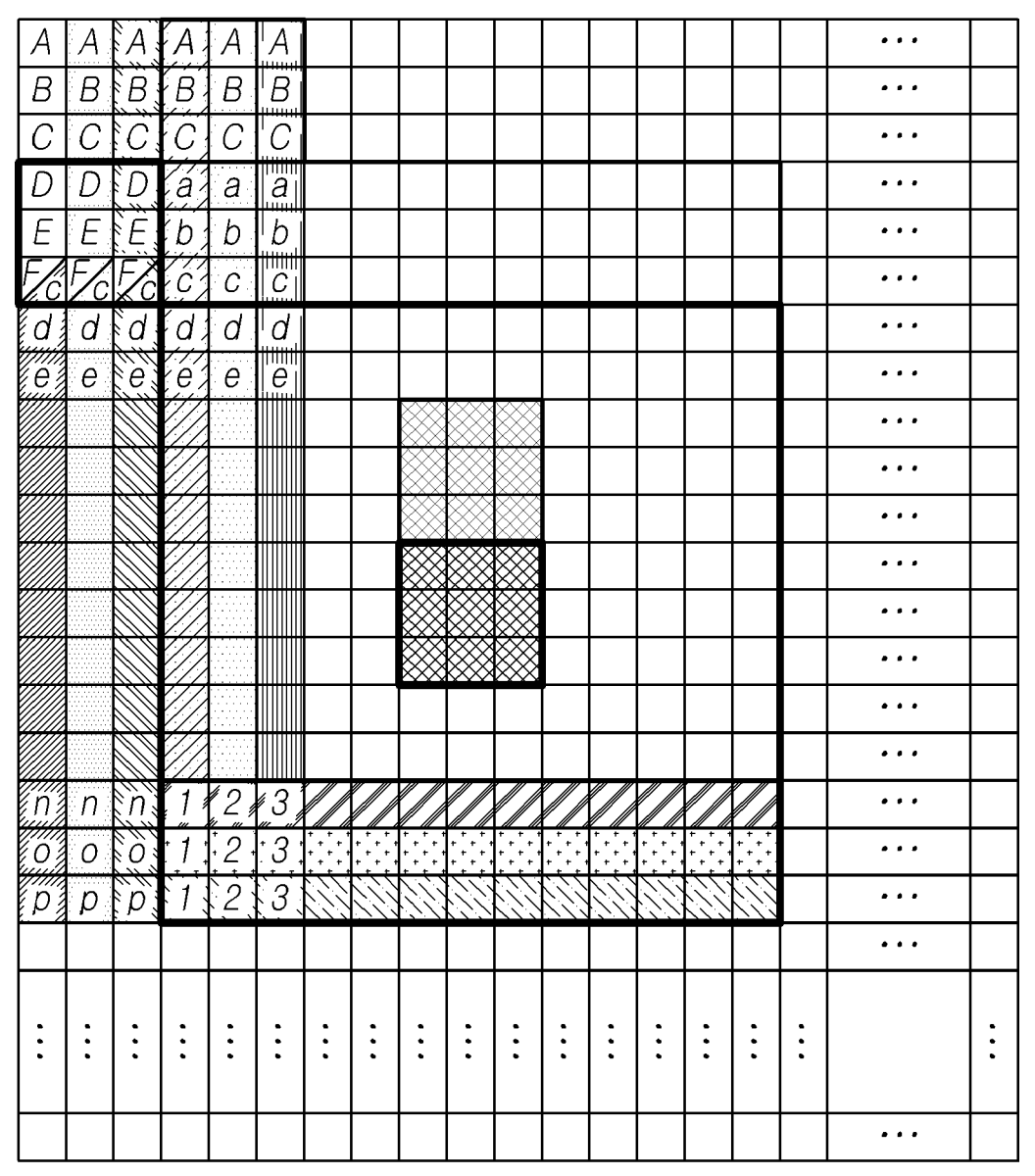
Figure 6C:
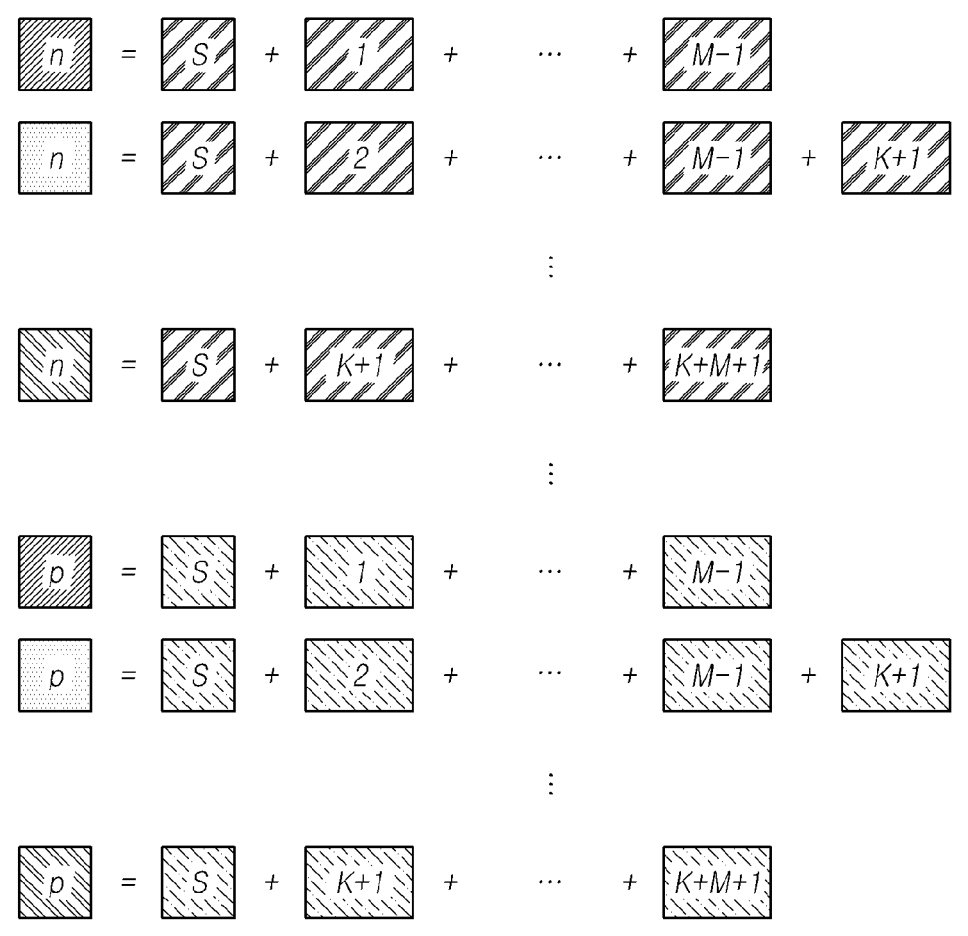

Since the process of calculating the repeated pixel values in advance in FIG. 6B and the process of adding the added pixel values using the repeated pixel values in FIG. 6C are the same as those in FIGS. 4B and 4C, the explanation thereof can be replaced by the explanation referring to FIGS. 4B and 4C.

FIG. 6D is a diagram illustrating a process of calculating block addition values according to an embodiment of the present invention. "D" performs the process of subtracting the values of the excluded pixels N with reference to "C" calculated in the process of FIG. 4E and adding the values of the added pixels L+N. Also, "E" and "F" are calculated through the process of subtracting the values of the excluded pixels with reference to the value "C" and adding the values of the added pixels.

Figure 7A:
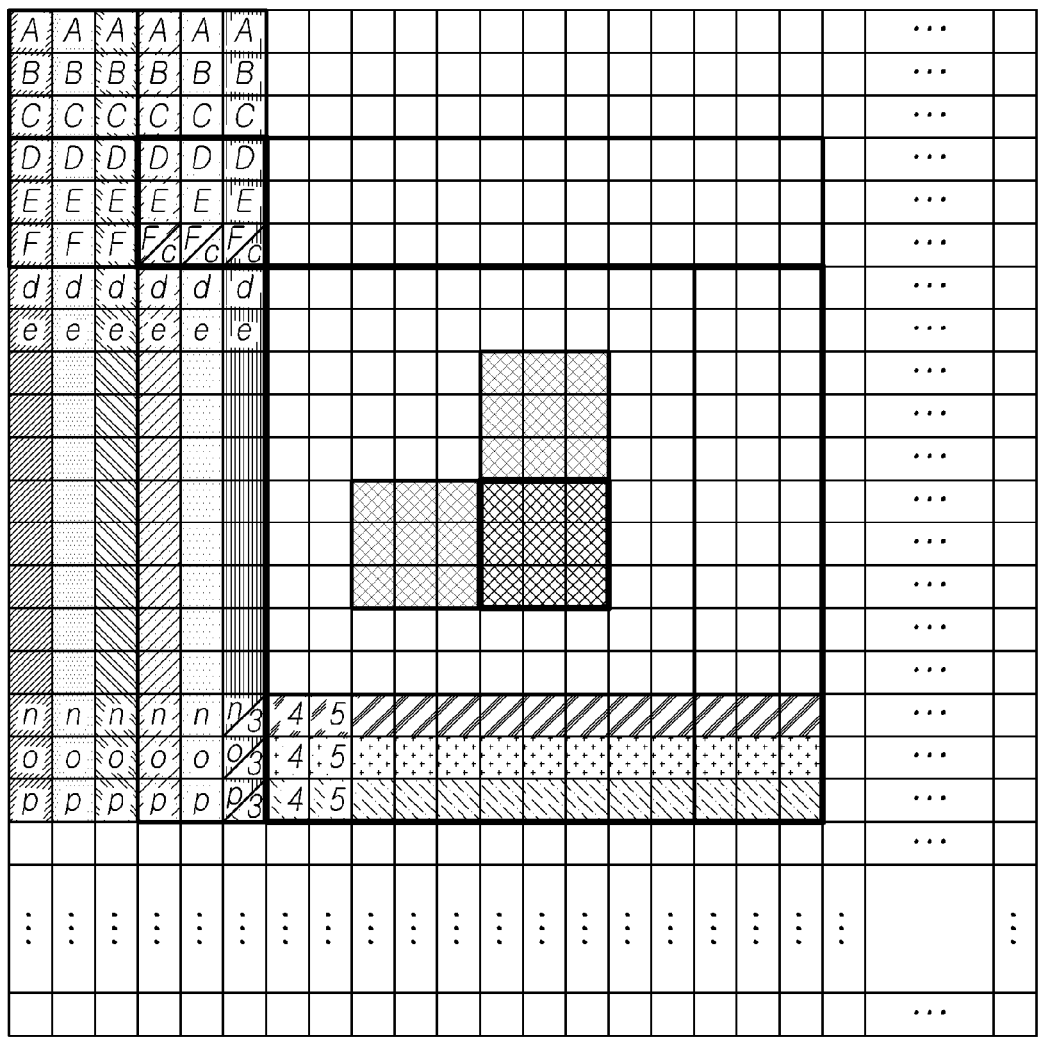

FIGS. 7A to 7C are diagrams illustrating processes of performing a block operation according to an embodiment of the present invention. A process of adding pixels of M columns newly added and excluding the pixel values of M excluded columns is performed. In this case, the difference between the processes of FIGS. 5A to 5D and the processes of FIGS. 6A to 6D is that both the previous addition results in the row direction and in the column direction can be used when a new block is operated.

FIG. 7B is a diagram illustrating a process of obtaining the row addition value according to an embodiment of the present invention. "721" proposes a process of subtracting the values of pixels M excluded from the row addition values previously obtained and adding the values of the added pixels (K+M). "722" and "723" also propose the process of subtracting the values of excluded pixels with reference to the row addition values previously calculated and adding the values of the added pixels.

FIG. 7C is a diagram illustrating a process of operating the block addition value according to an embodiment of the present invention. "D" performs the process of adding the values of the added pixels N and the excluded pixels based on the value "C" calculated in FIG. 5D. Also, "E" and "F" are calculated through the process of subtracting the values of the excluded pixels with reference to the value "C" and adding the values of the added pixels.

Referring to FIGS. 7A to 7C, the change according to the shift of the mask is to add the pixels of the newly added columns among the columns newly added to the lower end and to subtract the pixels of the columns being removed.

Through the processes of FIGS. 7B to 7D, the mask whole area that overlaps the mask whole region of the previous block occurs as the parallel pixel blocks to be operated among the parallel pixel blocks are horizontally arranged, and also the section that overlaps the mask whole region of the parallel pixel block positioned on the upper portion occurs as vertically seen in the drawing. As a result, by adding M*N pixels and excluding M*N pixels, the whole operation of the new blocks can be obtained.

Next, a process of performing a block operation according to an embodiment of the present invention will be described in detail.

Figure 8A:
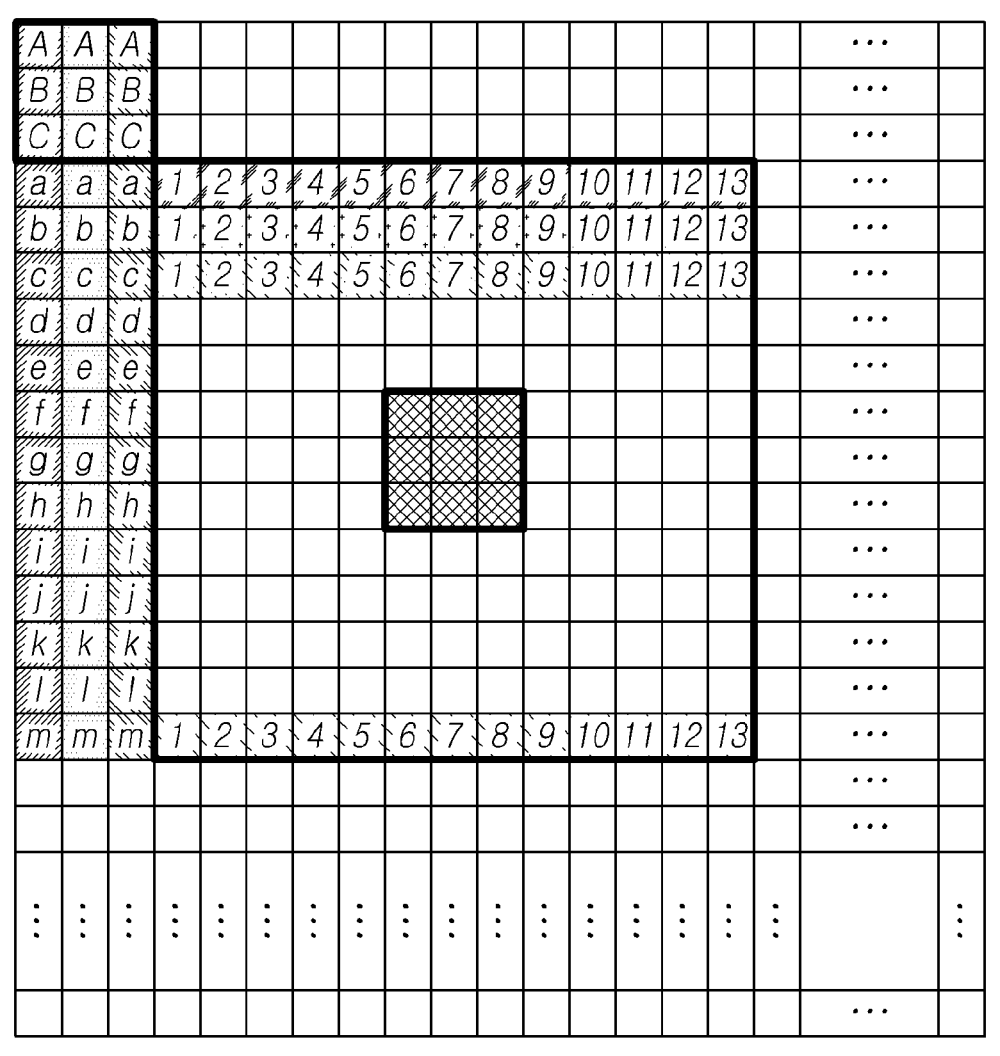
Figure 8B:
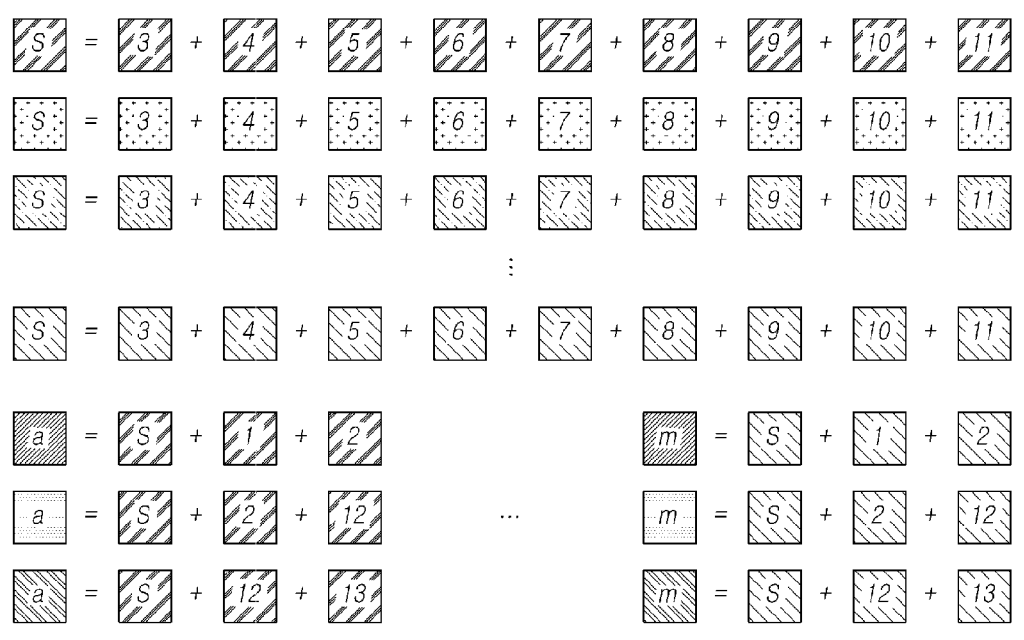

FIGS. 8A to 8C are diagrams illustrating processes of operating added values of a first block through implementation of the processes of FIGS. 4A to 4E.

FIG. 8A is a diagram illustrating the arrangement of the pixels for performing an addition of the first block.

The values of M, N, K, and L are 3, 3, 11, and 11, respectively. The size M×N of the parallel pixel blocks to be operated in parallel is 3×3, and the size K×L of the mask for one parallel pixel is 11×11. As a result, the number of masks that are operated in parallel with respect to one parallel pixel block (composed of 9 pixels) is also 9, and the size ((M+K−1)×(N+L−1)) of the mask whole region is 13×13.

FIG. 8B is a diagram illustrating a process of obtaining first the repeated value S and obtaining the row addition values using the obtained value S according to an embodiment of the present invention.

"S" adds the values of 9 pixels M to K which are 3, 4, . . . , 11, respectively, and these values are repeatedly used in obtaining the row addition values a, b, . . . m. The row addition values a, b, . . . , m may be obtained by adding the values of the newly added pixels to the S, respectively.

FIG. 8C is a diagram illustrating a process of obtaining the repeated value S and then obtaining the block addition values using the obtained value S.

The repeated row addition values c, d, . . . , k are stored in S. Also, the block addition values A, B, and C are calculated by adding the added values using S. For example, "A" can be obtained through a process of adding a and b to S, "B" can be obtained through a process of adding b and l to S, and "C" can be obtained through a process of adding l and m to S.

Figure 9A:
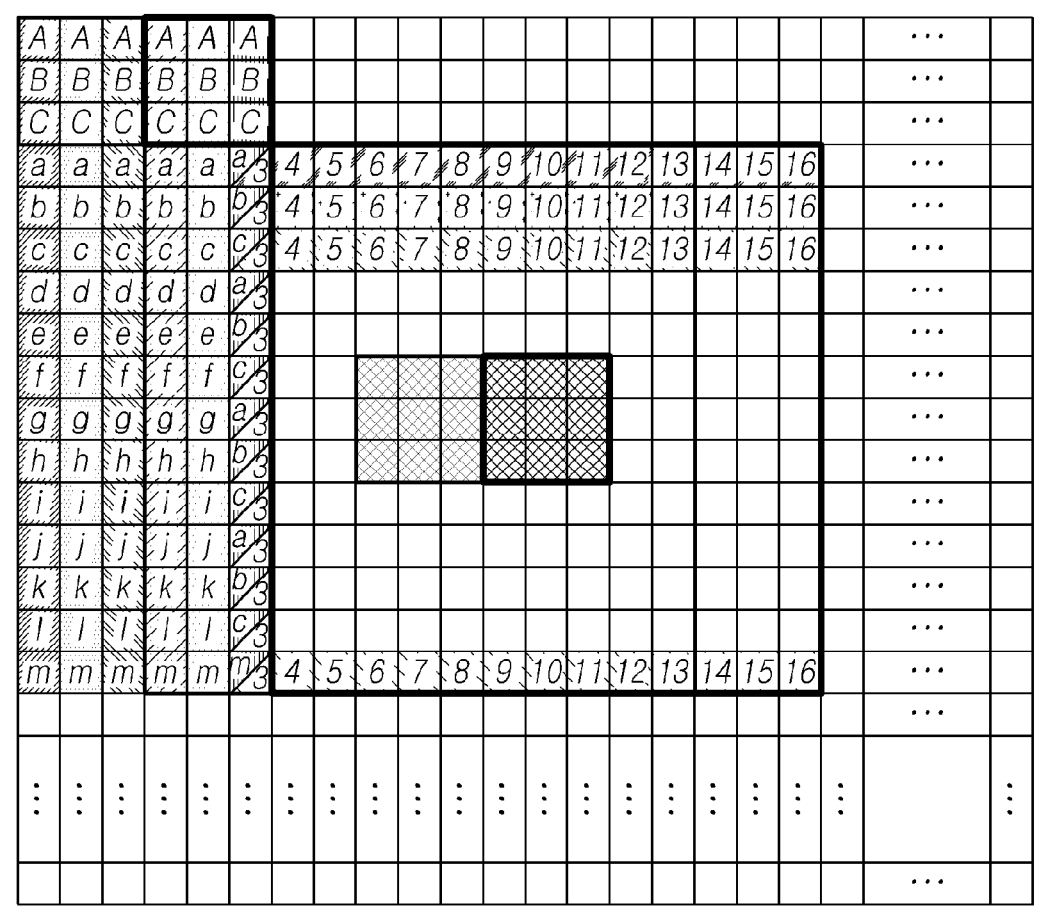
Figure 9B:
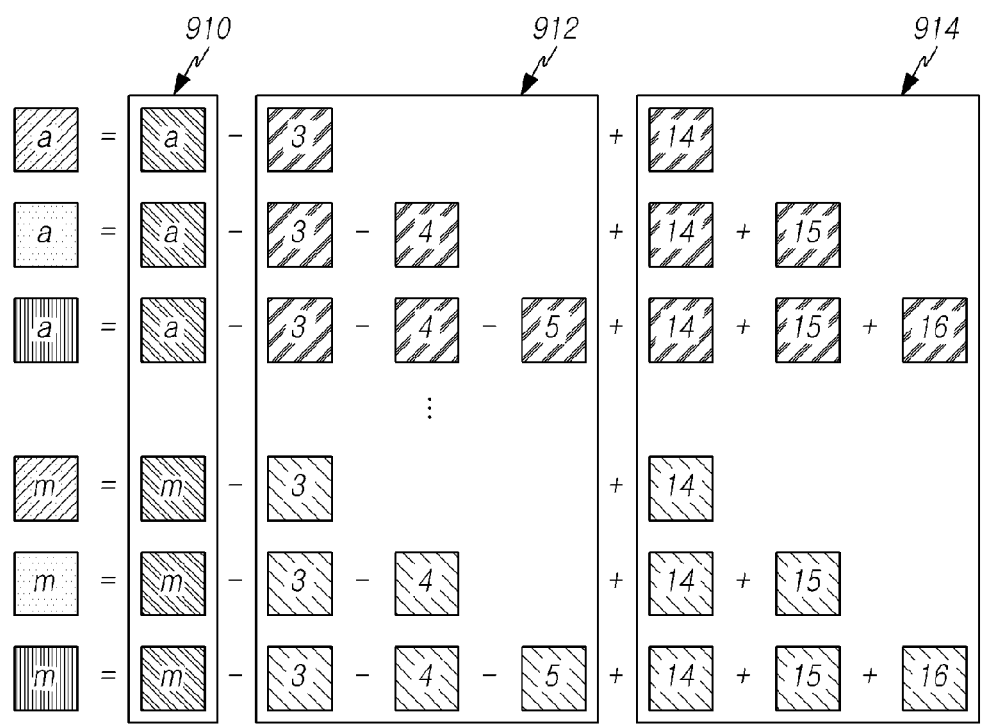

FIGS. 9A to 9C are diagrams illustrating processes of operating block added values of a block through implementation of the processes of FIGS. 5A to 5D FIG. 9A shows the parallel pixel block to be operated that is shifted to the right. Accordingly, the mask whole region of the parallel pixel blocks to be operated in FIG. 9A is in a state where the pixels of the first, second, and third columns are excluded and the pixels of the $14^{th}$, $15^{th}$, and $16^{th}$ columns are added based on the mask whole region of FIG. 8A. Accordingly, the process of obtaining the addition values of the respective columns is composed of a process of adding the pixel values of the added columns.

Figure 5A:
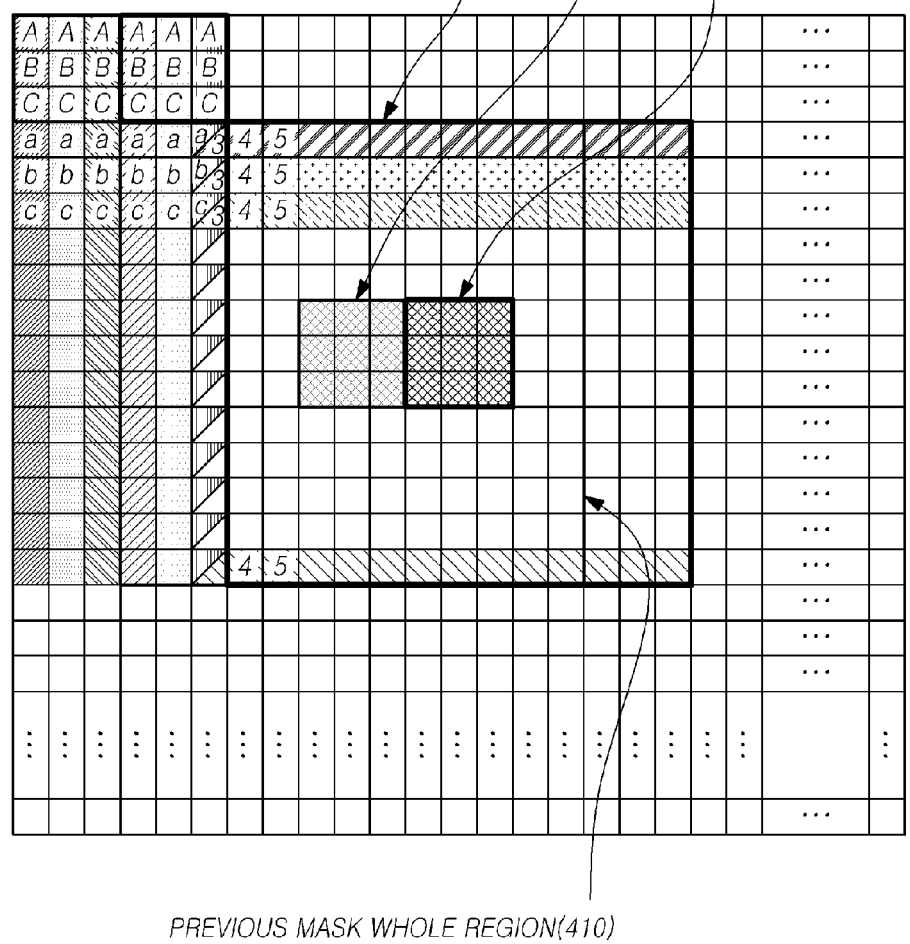
Figure 5C:
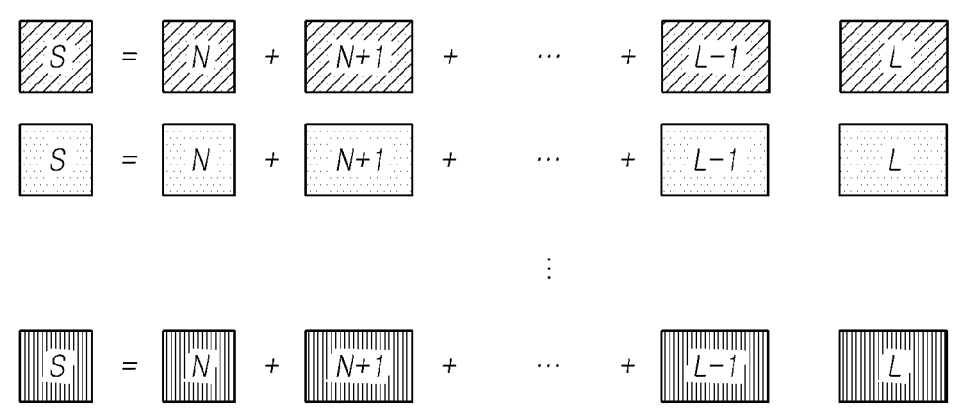

FIG. 9B is a diagram illustrating a process of calculating the row addition value of the second block through implementation of the processes of FIGS. 5A and 5B.

A process of subtracting the pixel values of the column 912 excluded from the row addition value 910 calculated in FIG. 8B and adding the pixel value of the added column 914 is performed.

FIG. 9C is a diagram illustrating a process of calculating the block addition value of the second block through the implementation of the processes of FIGS. 5D and 5E.

In order to calculate the repeated value S, pixel values of c, d, . . . , j, k are added. Then, the block addition values A, B, and C are calculated through addition of the added values using S. For example, "A" can be obtained through a process of adding a and b to S, "B" can be obtained through a process of adding b and 1 to S, and "C" can be obtained through a process of adding 1 and m to S.

Figure 10A:
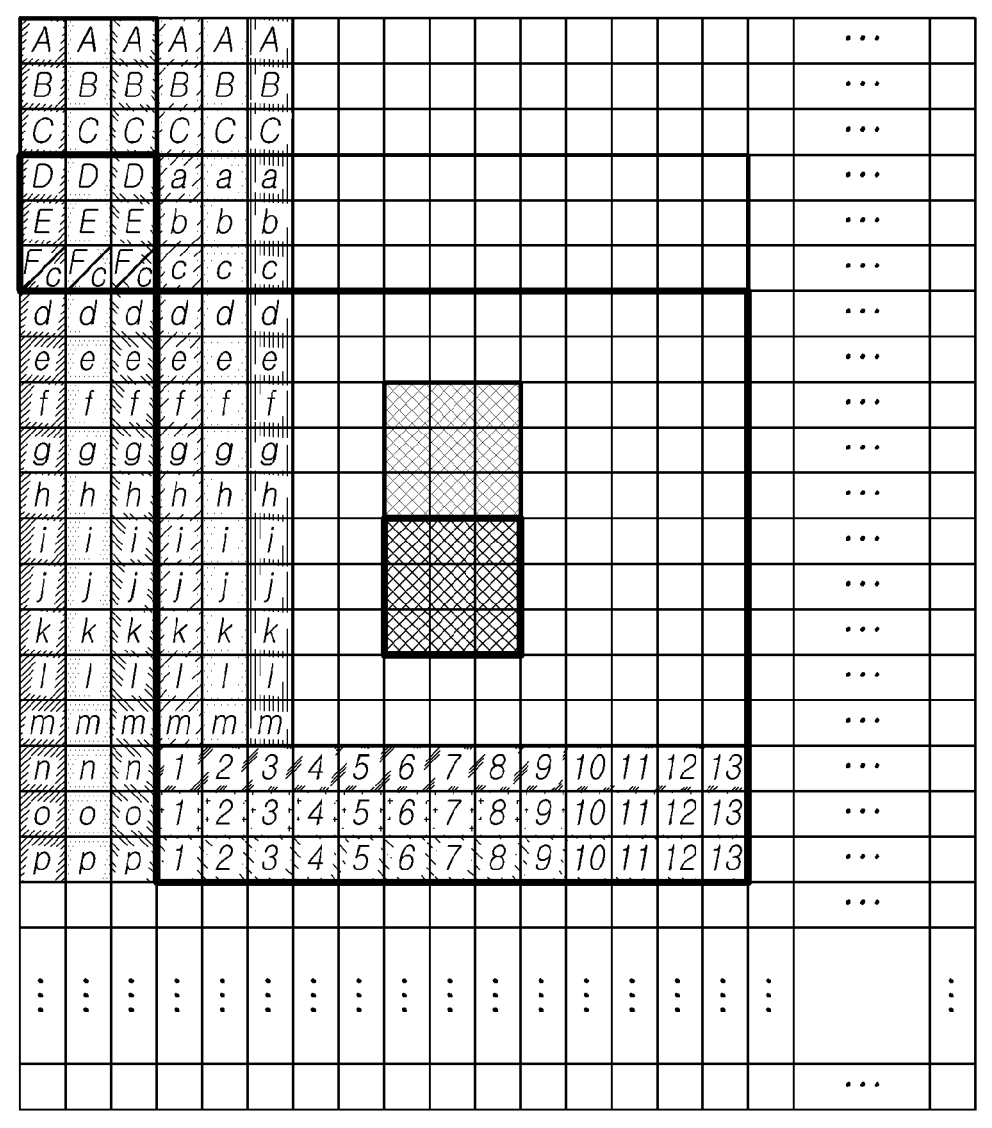
Figure 10B:
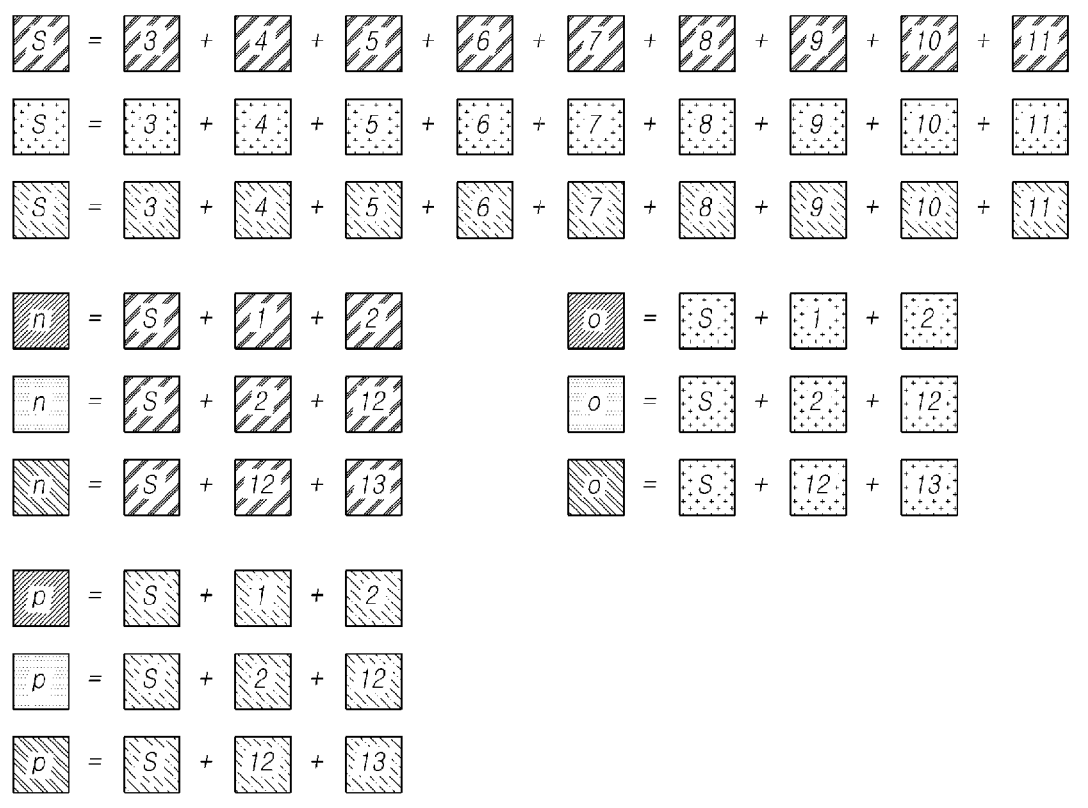
Figure 10C:
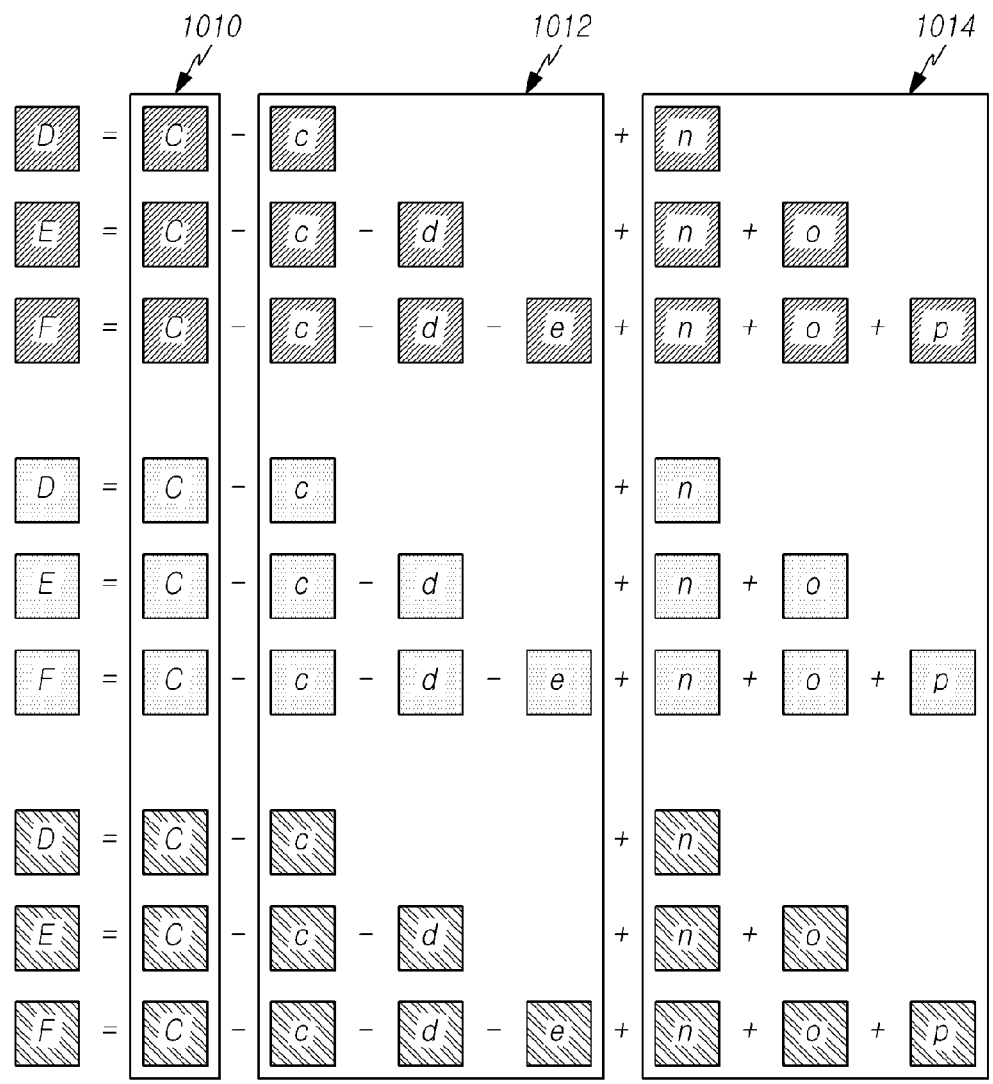

FIGS. 10A to 10C are diagrams illustrating processes of operating block added values of the third block through implementation of the processes of FIGS. 6A to 6D.

FIG. 10A shows the parallel pixel block to be operated that is shifted in the downward direction in comparison to that in FIG. 8A. Accordingly, the mask whole region of the parallel pixel blocks to be operated in FIG. 10A is in a state where three lower rows are added and three upper rows are excluded based on the mask whole region of FIG. 8A. Accordingly, the row addition values can be calculated by performing calculation only with respect to the three added rows with reference to the added and excluded rows.

FIG. 10B is a diagram illustrating a process of obtaining the row addition values with respect to the newly added rows according to an embodiment of the present invention.

FIG. 10B illustrates a process of obtaining the row addition values of three rows newly added through the implementation of FIGS. 6B and 6C. Separate calculation and using of the repeated calculation portion S is the same as that as described above.

FIG. 10C is a diagram illustrating a process that is performed through implementation of FIG. 6D. This process uses the block addition values C (1010) of FIG. 8C as calculated above, and can be calculated by subtracting the pixel values of the excluded row 1012 and adding the pixel values of the added row 1014.

Figure 11A:
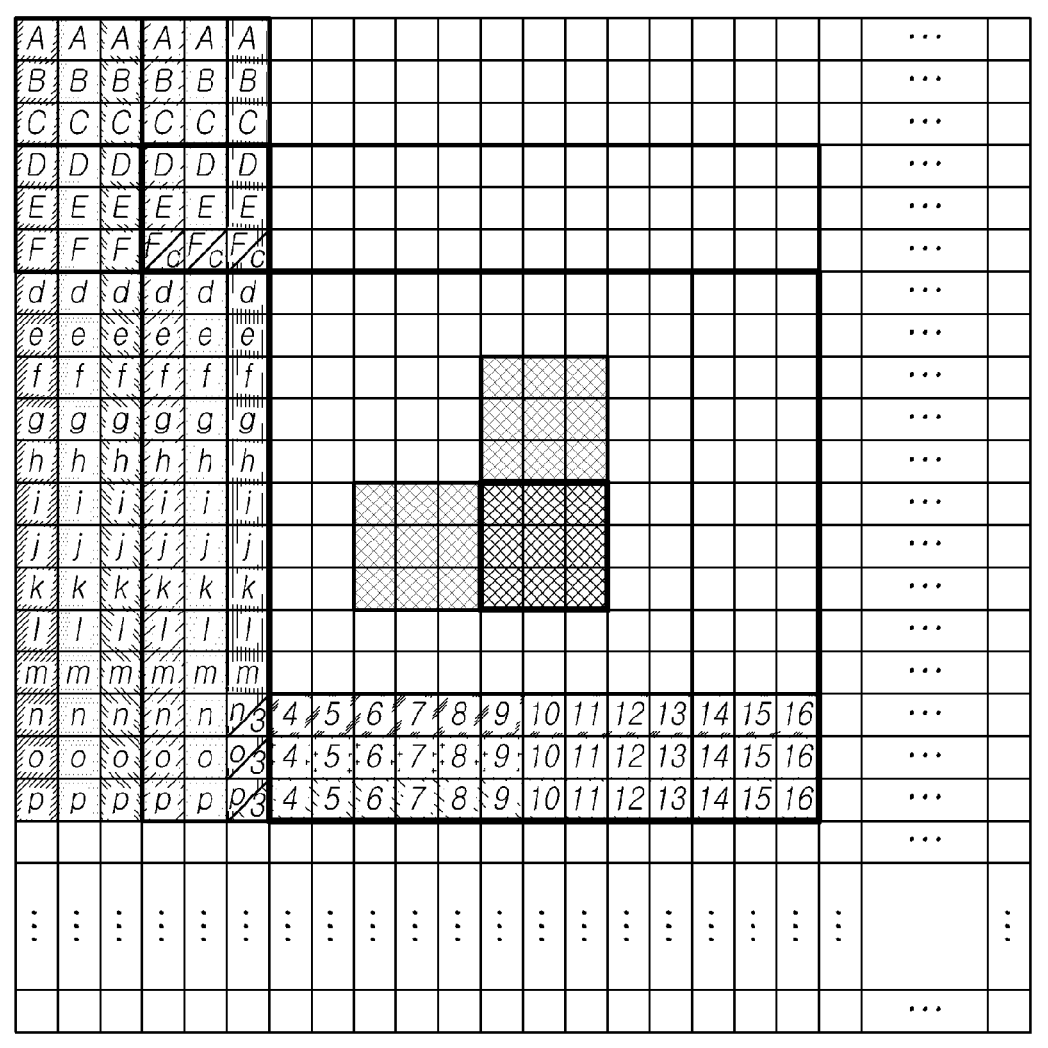
Figure 11B:
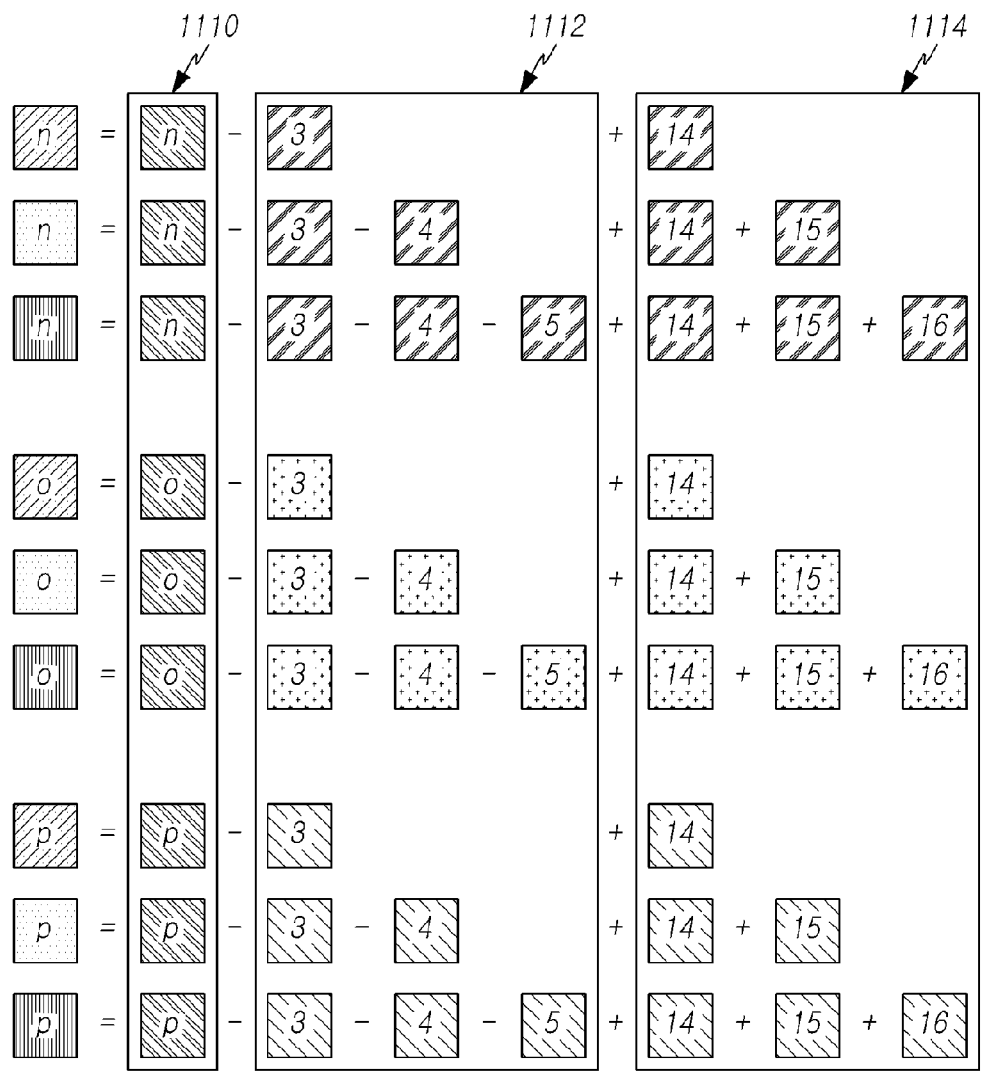
Figure 11C:
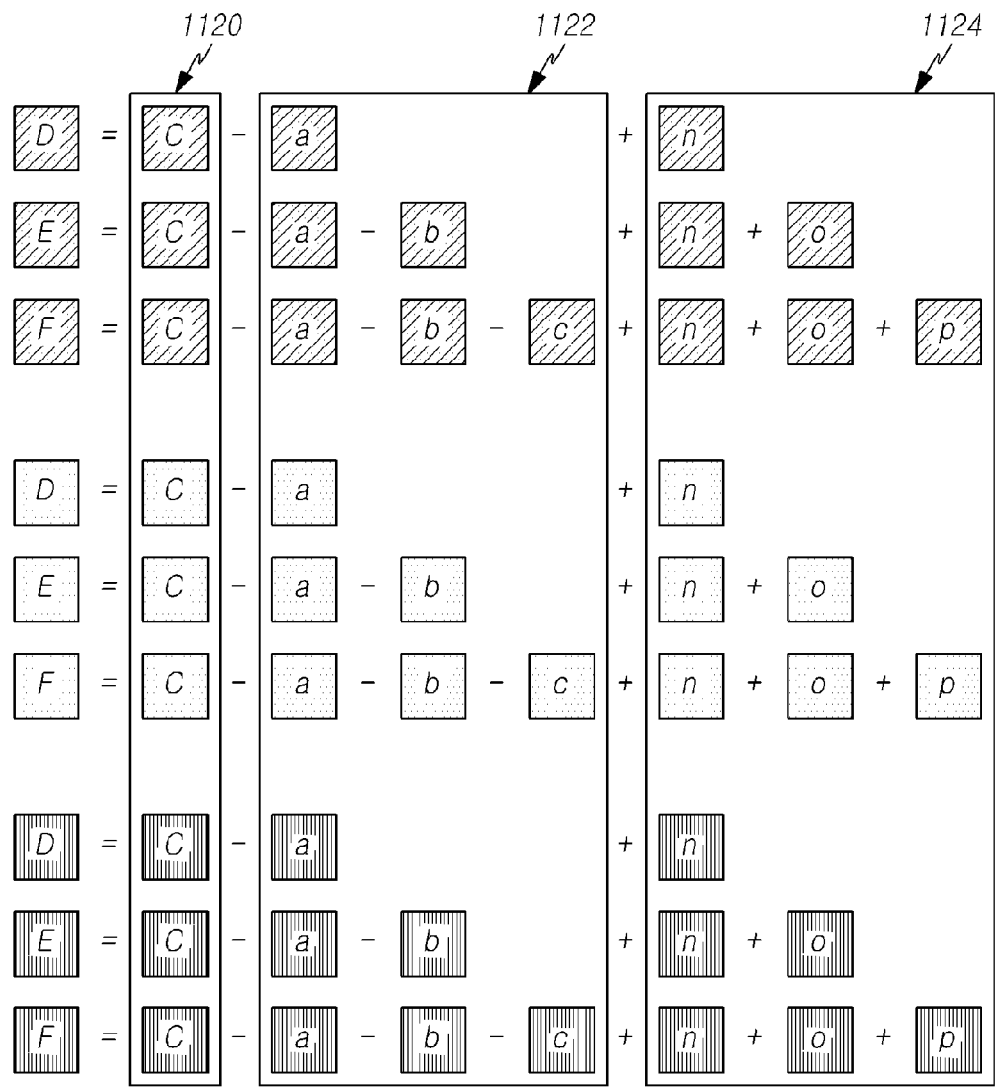

FIGS. 11A to 11C are diagrams illustrating processes of operating block added values of the fourth block through implementation of the processes of FIGS. 7A to 7C. The change according to the shift of the mask is to add the pixels 14, 15, and 16 of the three newly added columns among three columns newly added to the lower end and to subtract the pixels 3, 4, and 5 of the three columns getting out.

FIG. 11C illustrates a process of obtaining the block added values according to an embodiment of the present invention through implementation of FIG. 7C.

The pixel values of the row 1122 excluded due to the shift of the mask are subtracted from the block addition value 1120 calculated in FIG. 10C and the pixel values of the added row 1124 are added thereto.

As described above, the process of calculating the block addition values by applying the mask having a predetermined size with respect to the parallel pixel blocks has been described. The block addition value is a kind of block operation value, row addition, column addition, or the like in the mask range all correspond to one embodiment of the present invention, and diverse operations, such as addition, subtraction, mean value operation, and the like, can be applied thereto to obtain the block addition values.

In the embodiment of the present invention, in comparison to the conventional case where K*L adders are required to simultaneously operate the sum of the pixel values in the K×L masks in M*N blocks, ((M2(M+1)+N2(N+1))/2) adders and subtracters are required in most masks through application of the block based two-dimensional box filtering as described above, and thus the gain of reduction of the operation amount is improved in proportion to K and L in the case where the window mask is large in comparison to the size of the block.

Further, by simultaneously obtaining the sum of M*N pixels at a time, the gain of the processing speed can be increased M*N times.

FIG. 12 is a diagram illustrating processes of performing a block operation according to an embodiment of the present invention.

As described above, the block operation values are stored in the two-dimensional arrangement having a size of M×N. Accordingly, the operation is performed through M*N masks, and the size of the mask is K×L. M*N parallel pixel blocks to be operated in parallel are selected (step S1210). Then, the pixels included in the mask region having the size of K×L that is the parallel pixel operation region and the first region having the size of (M+K−1)×(N+L−1) that corresponds to the overlapping masks of M*N are selected (step S1220). As described above, this means the process of setting the parallel pixel blocks, masks corresponding to the respective parallel pixels, and the mask whole region.

Then, in order to calculate the "S" region that is the repeatedly calculated region in the mask whole region, the pixels of the second region commonly included in the mask regions of M*N are selected and stored as the repeated operation values (step S1230).

Then, using the repeated operation value, the block operation values of the parallel pixel blocks are operated (step S1240).

The repeated operation value includes the M-th to K-th pixels or the N-th to L-th pixels in the first region as described above.

In the process of calculating the block operation values, in order to reduce the operation with respect to the portion where the masks overlap one another, the first mask region corresponding to the first pixel among the parallel pixel block is selected, and the pixels of M−1 in the row direction which are not included in the second region (i.e. the region where the repeated operation is performed) or the pixels of N−1 in the column direction are operated together with the repeated operation values in the first mask region.

If operation with respect to one parallel pixel block is completed, the process of FIG. 12 is repeated with respect to another adjacent parallel pixel block. However, since the values calculated in the other adjacent parallel pixel block are used, a part of the process of FIG. 12 may be changed.

For example, a parallel pixel block which is parallel to the parallel pixel block in the first step and has a difference for M or N pixels in the row direction or column direction is selected and the pixels included in the mask region having the size of K×L that is the parallel pixel operation region of the fifth step and the third region having the size of (M+K−1)×(N+L−1) that corresponds to the overlapping masks of M*N are selected. Also, the values of the pixels that correspond to the first region (the mask whole region of the previous parallel pixel block) and the third region (the mask whole region of the new parallel pixel block) may be included in or excluded from the block operation values or the process of calculating the block operation values.

More specifically, the values of the pixels which do not overlap the first region and are included in the third region are excluded from the block operation values or the intermediate operation values generated in the process of calculating the block operation values.

The values of the pixels which are included in the first region but are not included in the third region may be included in the block operation values or the intermediate operation values generated in the process of calculating the block operation values. In order to perform the parallel box filtering according to the embodiment of the present invention, a repeated operation storage unit for storing the repeated addition values (repeated operation values), an intermediate operation storage unit for storing the operation results by rows or columns, and a block operation storage unit for storing the block operation result combined with the operation results by rows and columns are required.

Also, an operation unit for performing the repeated operation in the region to be operated, the operation by rows and columns, and the block operation is required.

More specifically, the operation unit selecting the parallel pixel blocks having the size of M*N to be operated in parallel and selecting the pixels included in the mask region having the size of K×L that is the parallel pixel operation region and the first region having the size of (M+K−1)×(N+L−1) that corresponds to the overlapping masks of M*N, the repeated operation storage unit storing the results of the pixels of the second region commonly included in the mask regions of M*N as the repeated operation values, and the block operation storage unit storing the results of the block operation values with respect to the parallel pixels are provided. The operation unit operates the block operation values with respect to the parallel pixel blocks using the repeated operation values stored in the repeated operation storage unit and storing the block operation values in the block operation storage unit.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of performing parallel box filtering in region based image processing, comprising:
    a first step of selecting parallel pixel blocks having a size of M×N to be operated in parallel;
    a second step of selecting pixels included in a mask region having a size of K×L that is a parallel pixel operation region and a first region having a size of (M+K−1)×(N+L−1) that corresponds to overlapping the M*N masks;
    a third step of selecting pixels of a second region commonly included in the mask regions of M*N and storing the results of operation with respect to the pixels of the second region as repeated operation values; and
    a fourth step of operating block operation values with respect to the parallel pixel blocks using the repeated operation values.

2. The method as claimed in claim 1, wherein the M is a horizontal size of the parallel pixel block, the N is a vertical size of the parallel pixel block, the K is a horizontal size of the mask, and the L is a vertical size of the mask;
    wherein the repeated operation value includes the M-th pixel to the K-th pixel which are horizontally arranged on a left boundary or a right boundary of the first region, or the N-th pixel to the L-th pixel which are vertically arranged on an upper boundary or a lower boundary of the first region; and
    wherein the horizontal or vertical arrangement is based on the boundary of the first region.

3. The method as claimed in claim 1, wherein the fourth step comprises the step of selecting a first mask region that corresponds to a first pixel in the parallel pixel block, and operating the pixels of M−1 in the row direction which are not included in the second region or the pixels of N−1 in the column direction in the first mask region together with the repeated operation values.

4. The method as claimed in claim 1, further comprising:
    a fifth step of, after the fourth step, selecting a parallel pixel block which is parallel to the parallel pixel block in the first step and has a difference for M or N pixels in the horizontal or vertical direction in the first region;
    a sixth step of selecting the pixels included in the mask region having the size of K×L that is the parallel pixel operation region in the fifth step and a third region having a size of (M+K−1)×(N+L−1) that corresponds to the overlapping the M*N masks; and
    a seventh step of including the pixel values, which do not overlap the first region and are included in the third region, in the block operation values or intermediate operation values generated in a process of calculating the block operation value, and excluding the pixel values, which are included in the first region but are not included in the third region, from the block operation values or the intermediate operation values generated in the process of calculating the block operation values.

5. An apparatus for performing parallel box filtering in region based image processing, comprising:
    an operation unit selecting parallel pixel blocks having a size of M×N to be operated in parallel and selecting pixels included in a mask region having a size of K×L that is a parallel pixel operation region and a first region having a size of (M+K−1)×(N+L−1) that corresponds to overlapping the M*N masks;

a repeated operation storage unit selecting pixels of a second region commonly included in the mask regions of M*N and storing the results of operation with respect to the pixels of the second region as repeated operation values; and a block operation storage unit storing the results of block operation values with respect to the parallel pixels;

wherein the operation unit operates the block operation values with respect to the parallel pixel blocks using the repeated operation values stored in the repeated operation storage unit and storing the block operation values in the block operation storage unit.

6. The apparatus as claimed in claim 5, wherein the M is a horizontal size of the parallel pixel block, the N is a vertical size of the parallel pixel block, the K is a horizontal size of the mask, and the L is a vertical size of the mask;

wherein the repeated operation value includes the M-th pixel to the K-th pixel which are horizontally arranged on a left boundary or a right boundary of the first region, or the N-th pixel to the L-th pixel which are vertically arranged on an upper boundary or a lower boundary of the first region; and wherein the horizontal or vertical arrangement is based on the boundary of the first region.

7. The apparatus as claimed in claim 5, wherein the operation unit selects a first mask region that corresponds to a first pixel in the parallel pixel block, and operates the pixels of M−1 in the row direction which are not included in the second region or the pixels of N−1 in the column direction in the first mask region together with the repeated operation values stored in the repeated operation storage unit.

8. The apparatus as claimed in claim 5, wherein the operation unit selects a parallel pixel block which is parallel to the parallel pixel block in the first step and has a difference for M or N pixels in the horizontal or vertical direction in the first region, and selects the pixels included in the mask region having the size of K×L that is the selected parallel pixel operation region and a third region having a size of (M+K−1)×(N+L−1) that corresponds to the overlapping the M*N masks; and includes the pixel values, which do not overlap the first region and are included in the third region, in the block operation values or intermediate operation values generated in a process of calculating the block operation value; and excludes the pixel values, which are included in the first region but are not included in the third region, from the block operation values or the intermediate operation values generated in the process of calculating the block operation values.

* * * * *